(12) United States Patent
Bogineni et al.

(10) Patent No.: US 11,128,545 B2
(45) Date of Patent: Sep. 21, 2021

(54) INTELLIGENT PRIORITIZED MOBILITY OF LOW-LATENCY APPLICATIONS

(71) Applicant: Verizon Patent and Licensing Inc., Arlington, VA (US)

(72) Inventors: Kalyani Bogineni, Hillsborough, NJ (US); Jignesh S. Panchal, Hillsborough, NJ (US); Hans Raj Nahata, New Providence, NJ (US); Ratul Kumar Guha, Warwick, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 48 days.

(21) Appl. No.: 16/219,458

(22) Filed: Dec. 13, 2018

(65) Prior Publication Data
US 2020/0195521 A1 Jun. 18, 2020

(51) Int. Cl.
*H04L 12/24* (2006.01)
*H04W 36/28* (2009.01)
(Continued)

(52) U.S. Cl.
CPC ...... *H04L 41/5022* (2013.01); *H04L 41/5003* (2013.01); *H04W 36/00835* (2018.08);
(Continued)

(58) Field of Classification Search
CPC  H04L 41/5003; H04W 48/18; H04W 72/042; H04W 76/27; H04W 48/16;
(Continued)

(56) References Cited

U.S. PATENT DOCUMENTS

2003/0149774 A1* 8/2003 McConnell ............. H04L 29/06
709/227
2017/0367036 A1* 12/2017 Chen ....................... H04L 43/08
(Continued)

OTHER PUBLICATIONS

3rd Generation Partnership Project (3GPP TM), "3GPP TS 38.300: Technical Specification Group Radio Access Network; NR and NG-RAN Overall Description (Release 15)," European Telecommunications Standards Institute, Oct. 2018, 93 pages.

(Continued)

*Primary Examiner* — Ian N Moore
*Assistant Examiner* — Sun Jong Kim

(57) ABSTRACT

A radio access network (RAN) node can receive, from a user equipment (UE), a request to establish a session associated with a low-latency service level agreement (SLA). The session can be mapped to a radio bearer associated with a network slice configured to support the low-latency SLA, wherein the network slice can include a RAN portion and a core network portion that are co-located at a RAN edge to support the low-latency SLA. The RAN node can provide information related to the radio bearer to a distributed unit (DU) associated with the RAN portion of the network slice and route traffic associated with the session through the network slice configured to support the low-latency SLA via the radio bearer mapped to the session. As such, the session can have a context maintained in the RAN portion and the core network portion of the network slice.

20 Claims, 8 Drawing Sheets

(51) Int. Cl.
　　　*H04W 48/18*　　(2009.01)
　　　*H04W 36/00*　　(2009.01)
　　　*H04W 36/22*　　(2009.01)
　　　*H04W 48/16*　　(2009.01)
　　　*H04W 48/04*　　(2009.01)
(52) U.S. Cl.
　　　CPC ......... *H04W 36/22* (2013.01); *H04W 36/28* (2013.01); *H04W 48/04* (2013.01); *H04W 48/16* (2013.01); *H04W 48/18* (2013.01)
(58) Field of Classification Search
　　　CPC ..... H04W 36/28; H04W 36/08; H04W 76/10; H04W 76/19; H04W 40/36; H04W 4/00; H04W 36/0033; H04W 72/02
　　　See application file for complete search history.

(56) References Cited

U.S. PATENT DOCUMENTS

| | | | | |
|---|---|---|---|---|
| 2018/0192429 | A1* | 7/2018 | Yang | H04W 72/1205 |
| 2018/0199228 | A1* | 7/2018 | Van Phan | H04L 69/18 |
| 2018/0367288 | A1* | 12/2018 | Vrzic | H04W 36/0069 |
| 2018/0376380 | A1* | 12/2018 | Leroux | H04W 36/0011 |
| 2019/0261236 | A1* | 8/2019 | Wang | H04W 36/04 |
| 2020/0053617 | A1* | 2/2020 | Park | H04W 36/14 |
| 2020/0067793 | A1* | 2/2020 | Dribinski | H04W 36/00837 |

OTHER PUBLICATIONS

3rd Generation Partnership Project (3GPP TM), "3GPP TS 38.331: Technical Specification Group Radio Access Network; NR; Radio Resource Control (RRC) protocol specification (Release 15)," European Telecommunications Standards Institute, Sep. 2018, 338 pages.

3rd Generation Partnership Project (3GPP TM), "3GPP TS 38.401: Technical Specification Group Radio Access Network; NG-RAN; Architecture description; (Release 15)," European Telecommunications Standards Institute, Sep. 2018, 39 pages.

3rd Generation Partnership Project (3GPP TM), "3GPP TS 38.473: Technical Specification Group Radio Access Network; NG-RAN; F1 application protocol (F1AP); (Release 15)," European Telecommunications Standards Institute, Sep. 2018, 176 pages.

3rd Generation Partnership Project (3GPP TM), "TR 38.806: Technical Specification Group Radio Access Network; Study of separation of NR Control Plane (CP) and User Plane; (UP) for split option 2; (Release 15)," European Telecommunications Standards Institute, Dec. 2017, 22 pages.

Tony Saboorian and Amanda Xiang, "Network Slicing and 3GPP Service and Systems Aspects (SA) Standard," IEEE Software Defined Networks, IEEE Softwarization, Dec. 2017, 7 pages, <https://sdnieee.org/newsletter/december-2017/network-slicing-and-3gpp-service-and-systems-aspects-sa-standard>.

* cited by examiner

INTELLIGENT PRIORITIZED MOBILITY OF LOW-LATENCY APPLICATIONS

BACKGROUND

A fifth generation (5G) or New Radio (NR) network, as specified by the Third Generation Partnership Project (3GPP), is a next generation wireless standard that provides various enhancements to wireless communications, such as flexible bandwidth allocation, improved spectral efficiency, ultra-reliable low-latency communications (URLLC), beamforming, high-frequency (e.g., millimeter wave (mmWave)) communication, and/or the like. Furthermore, a 5G network allows deployment of a distributed core network and a disaggregated radio access network (RAN) architecture to support diverse use cases with vastly different service level agreements (SLAs). Support for these diverse use cases can be achieved through network slices (e.g., logical network instances customized to support the SLAs).

DETAILED DESCRIPTION OF PREFERRED EMBODIMENTS

Figure 1A:
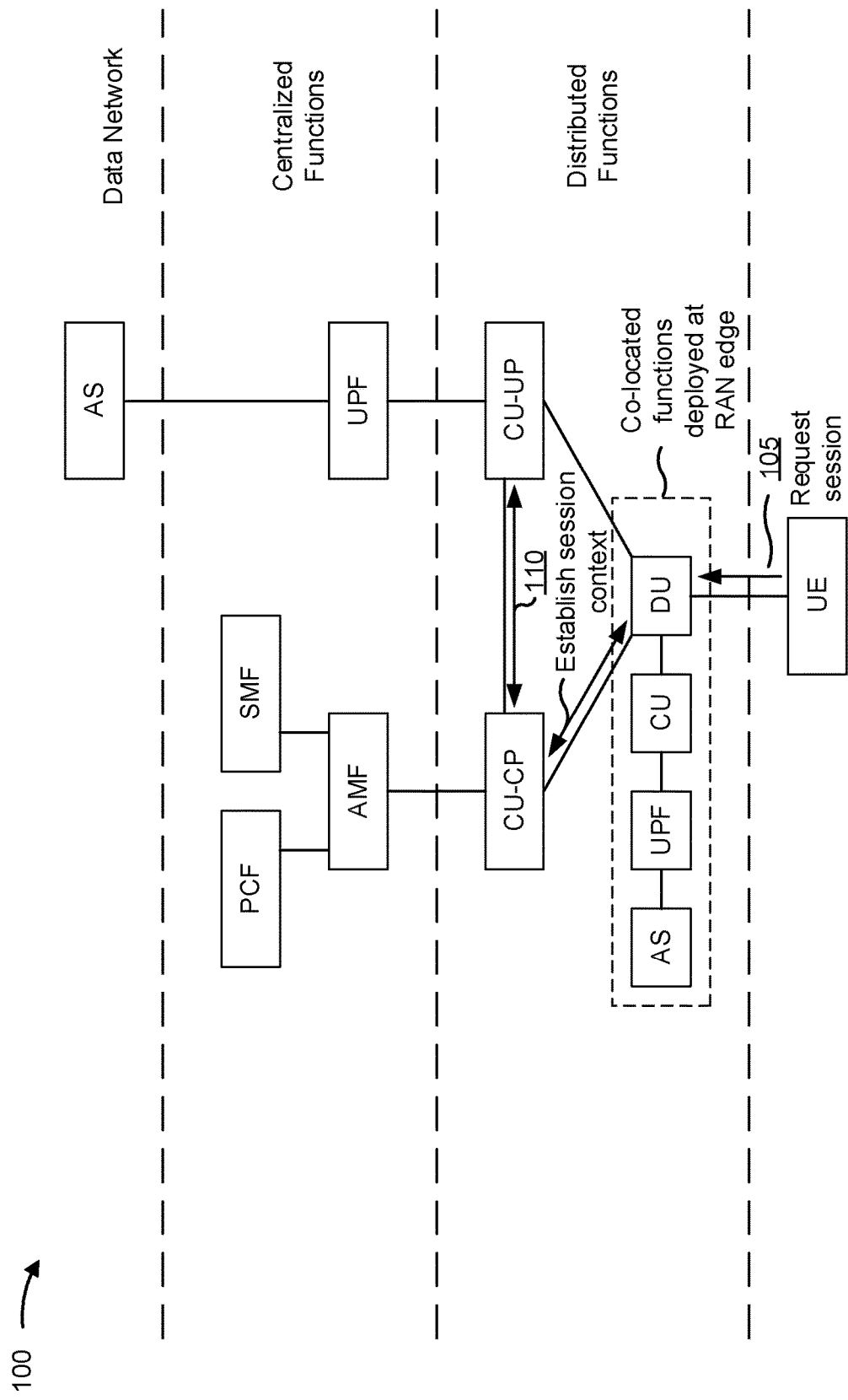
FIGS. 1A-1E are diagrams of one or more example implementations described herein.

The following detailed description of example implementations refers to the accompanying drawings. The same reference numbers in different drawings can identify the same or similar elements.

In a wireless telecommunications system, such as a 5G wireless telecommunications network, network slicing can allow for multiple virtual networks to run on a single physical network to support multiple services, applications, and/or entities (e.g., end users, customers, such as organizations that provide a service to end users of the wireless telecommunications systems, and/or the like). In some instances, when a user equipment (UE) requests a connection (e.g., protocol data unit (PDU) connectivity) to the network for an application and/or service, the UE provides the network with information associated with the UE, the application, and/or the service. Such information can include network slice selection assistance information (NSSAI), which can include a collection or list of individual, single-network slice selection assistance information (S-NSSAI) (which can be referred to herein individually as "S-NSSAI" or collectively as "S-NSSAIs"). In general, the S-NSSAI can identify respective network slices associated with the UE. In such cases, a network slice selection function (NSSF) can determine a network slice instance (NSI) (e.g., a virtual network of network functions (NFs) and other resources to support one or more S-NSSAIs) for the S-NSSAI. The NSSF can provide, to an access and mobility management function (AMF), an NSI identifier (NSI ID) associated with the NSI. Further, the AMF can provision a communication session, using the corresponding NSI, for the UE.

In general, a network slice can refer to a logical end-to-end network that can be dynamically created to serve a particular service type with an agreed-upon service level agreement (SLA), where a single UE can access or otherwise connect in parallel to multiple network slices that share a common AMF over a single radio interface (or air interface). Each network slice can be configured to give a very distinct customer experience (e.g., ultra-reliable (UR) services, ultra-high bandwidth (UHB), extremely low-latency, ultra-reliable low-latency communication (URLLC), and/or the like). For example, in a given scenario, a UE could be associated with a first network slice for Internet browsing, a second network slice for an augmented reality (AR) and/or virtual reality (VR) game, a third network slice for vehicle-to-everything (V2X) communication, and/or the like. This raises questions as to where an Internet Protocol (IP) anchor point should be for certain services (or network slices). In particular, for certain low-latency services, such as V2X, URLLC, edge computing, gaming, and/or the like, the application server and/or content that follows the IP anchor point cannot afford to be sitting in or beyond the core network. For example, when the application server and/or content that serves the particular network slice associated with low-latency service(s) are physically and/or logically remote from the radio interface used to communicate with the UE, there is a risk that the network will be unable to comply with the SLA or otherwise satisfy performance (e.g., Quality of Service (QoS)) requirements associated with the low-latency service(s).

Some implementations described herein can configure one or more radio access network (RAN) nodes with intelligence that can be used to ensure, in substantially real-time, that traffic related to certain applications or services associated with a low-latency SLA can be served locally (i.e., closer to the UE) while traffic related to other latency-tolerant applications or services can traverse the core network. For example, in some implementations, the one or more RAN nodes can be configured with intelligence that relates to a mapping of applications and/or services to low-latency and/or latency-tolerant radio bearers. In general, the low-latency radio bearers can traverse a network slice that includes a RAN portion and a core network portion that are co-located with a data network portion (e.g., an application server) at a RAN edge. Furthermore, in some implementations, application content and/or other context information used for service delivery can be moved between geographically different radio sites to provide seamless support for localized low-latency services over a larger geographic footprint. Moreover, some implementations described herein can simultaneously move one or more non-localized services (e.g., best efforts services that do not have a strict SLA) together with one or more localized (i.e., low-latency) services associated with a given UE. For example, in some implementations, information related to a context associated with one or more services having a low-latency SLA can be provided to one or more neighboring nodes at multiple layers (e.g., RAN and core network layers) in anticipation of (i.e., prior to) a potential handover of the UE.

In this way, by serving low-latency services through co-located functions that are deployed at the RAN edge, implementations described herein can achieve faster response times, ensure compliance with low-latency SLAs, and offload low-latency traffic from other portions of the RAN and/or core network. In this way, by providing differentiated handling of traffic for different network slices, network resources can be conserved, as the co-located functions deployed at the RAN edge can be dedicated to low-latency traffic while other RAN and/or core network nodes can conserve communication, processing, memory, and/or other resources that would otherwise be expended servicing low-latency traffic that can have a higher priority, SLA, QoS requirement, and/or the like relative to other traffic travelling through the core network. Furthermore, by providing neighboring nodes with information related to the context associated with the one or more services having the low-latency SLA prior to a potential handover, implementations described herein can ensure substantially continuous compliance with the low-latency SLA prior to, during, and after a mobility event. In this way, continuity in service can be achieved with substantially no disruption to a user experience, as the user would not perceive any increase in latency when moving from a first radio site to a second radio site because the context related to the low-latency service is provided to the second radio site prior to handover.

FIGS. 1A-1E are diagrams of one or more example implementations 100 described herein. In particular, example implementation(s) 100 illustrate various portions of a wireless telecommunications system (referred to herein as a "wireless network" or simply "network"), which in some implementations can be a 5G wireless telecommunications system, a 4G wireless telecommunications system, a long-term evolution (LTE) wireless telecommunications system, a LTE-Advanced (LTE-A) wireless telecommunications system, and/or the like.

As shown in FIGS. 1A-1E, implementation 100 can include a UE wirelessly connected to a radio access network (RAN), which is connected to a data network via a core network. The UE can run an application that involves communicating with an application server (AS) in the data network. Accordingly, in some implementations, the UE can enter into a communication session (e.g., a PDU session) with the data network via the RAN and the core network. The UE and the core network can communicate application-specific data during the communication session. In some implementations, to permit the UE to enter into the communication session with the data network, the UE can send an initial request to register with the core network.

In some implementations, the UE in example implementation(s) 100 can be a communication and/or computing device, such as a mobile phone, a smartphone, a laptop computer, a tablet computer, an Internet of Things device, and/or the like. The RAN can include one or more base stations that provide an access point to the RAN, such as a 5G next generation NodeB (gNodeB or gNB), an LTE evolved NodeB (eNodeB or eNB), and/or the like. In some implementations, the base station facilitates a communication session by communicating application-specific data between the UE and the core network. In some implementations, the base station can have a disaggregated or "split" architecture, including one or more distributed units (DUs) and one or more central units (CUs), where the one or more CUs can be further split into a control plane (CU-CP) node and a user plane (CU-UP) node.

More particularly, in some implementations, each DU can correspond to a logical node that hosts Radio Link Control (RLC), Medium Access Control (MAC), and Physical (PHY) layers of the base station. Operations of the DU can be controlled, at least in part, by the one or more CUs. In general, one DU can support one or multiple cells, although any one cell is typically supported by only one DU. Each CU can correspond to a logical node that hosts Radio Resource Control (RRC) and Packet Data Convergence Protocol (PDCP) functions associated with the base station. Furthermore, in some implementations, one or more CUs can optionally further host Service Data Adaptation Protocol (SDAP) functions associated with the base station. When a CU is split into a CU-CP node and a CU-UP node, the CU-CP node can correspond to a logical node that hosts the RRC and control plane part of the PDCP protocol, while the CU-UP node can correspond to a logical node that hosts the user plane part of the PDCP protocol. Furthermore, in some implementations, the CU-UP can optionally further host the SDAP protocol associated with the base station. In some implementations, there can be multiple CU-UP nodes in the RAN and each CU-UP node can be associated with one or more network slices that are identified via one or more S-NSSAI (e.g., there can be multiple network slices connecting to a given CU-UP node, a different CU-UP node for each network slice, and/or the like). Furthermore, a split of layers and/or protocols among the CU unit and the DU(s) can be flexible and vary from one implementation to another.

In this way, by disaggregating the base station into one or more DUs and one or more CUs, the base station can be implemented with a flexible hardware design that allows scalable cost-effective solutions and coordination of load management, real-time performance optimization, virtualized deployment, and adaptation to various use cases, such as variable transport latency.

In some implementations, when the base station is split into separate DU, CU-CP, and CU-UP nodes, the various nodes associated with the base station can be deployed in various ways. For example, in general, there can be one or multiple DUs, one or multiple CU-CP nodes, and one or multiple CU-UP nodes. Depending on the particular RAN implementation, one DU can be connected to one or more CU-CP nodes via an F1-C interface, one DU can be connected to multiple CU-UP nodes via an F1-U interface under the control of a single CU-CP node, one CU-UP node can be connected to multiple DUs via the F1-U interface under the control of a single CU-CP node, and one CU-UP node can be connected to one or more CU-CP nodes via an E1 interface. Furthermore, in some implementations, the CU-CP node and/or the CU-UP node can be deployed in a centralized manner and/or a distributed manner in various use cases. For example, the CU-CP node and the CU-UP node can both be centralized, with the centralized CU-CP node used to coordinate the operation of several DUs and the centralized CU-UP node used to provide a central termination point for user plane traffic. In another example, the CU-CP node can be deployed in a distributed manner and co-located with a single DU, in which case the co-located CU-CP node can supervise the operation of the single DU. In still another example, the CU-UP node can be distributed and co-located with a single DU. Of course, in a given RAN, different deployment scenarios could be used in combination. For example, the example implementation(s) 100 illustrated in FIGS. 1A-1E includes a centralized CU-CP node that can coordinate the operation of several DUs, a centralized CU-UP node that can provide a centralized termination point for certain user plane traffic, and a distributed CU (which can be a CU-CP node, a CU-UP node, and/or a CU that combines -CP and -UP functions) co-located with a single DU at a RAN edge, although a cardinality relating to a quantity of DUs to CU-UPs and/or CU-CPs can vary in some implementations.

In this way, splitting the CU into separate CU-CP and CU-UP nodes and/or allowing various centralized and/or distributed deployments for the CU, CU-CP node, and CU-UP node can enable flexibility to operate and manage complex networks that support different network topologies, resources, and new service requirements, enable a functional decomposition of radio access between user plane and control plane entities based on a partially decoupled architecture, enable independent scaling and realization for control plane and user plane functions, and enable the location of different RAN functions to be optimized based on the scenario and desired performance. For example, the CU-CP node could be placed in a location close to the DU to provide short latency for critical control plane procedures, the CU-UP node could be centralized in a regional or national data center to favor cloud implementation(s), an additional CU-UP node could also be co-located and/or placed closer to the DU to provide a local termination point for URLLC, V2X, and/or other low-latency traffic, and/or the like. Furthermore, the split architecture can support radio resource isolation and improve resource utilization and provide network slice-level isolation for a network slice instance (NSI), which can cover a geographic area of several base stations.

In some implementations, the core network in example implementation(s) 100 can include various types of telecommunications core networks, such as a 5G next generation core network (NG Core), an LTE evolved packet core (EPC), and/or the like. As shown in FIGS. 1A-1E, the core network can include one or more access and mobility management functions (AMFs), one or more User Plane Functions (UPFs), one or more Session Management Functions (SMFs), and one or more Policy Control Function (PCFs), among other nodes and/or network functions. In some implementations, one or more of the core network elements can be co-located with one or more RAN nodes (e.g., at the RAN edge) to support certain sessions that can be associated with a low-latency SLA. For example, as shown in FIGS. 1A-1E, co-located RAN functions that are deployed at the RAN edge can include a DU, a CU (e.g., a CU-CP node, a CU-UP node, and/or a CU combining -CP and -UP functions), which can be further co-located with a UPF core network element that provides an IP anchor point for connecting to an application server associated with a data network. In this way, low-latency traffic can be routed through the co-located functions that are deployed at the RAN to provide faster response times for time-sensitive traffic, resource isolation for latency-tolerant traffic that traverses the RAN, the core network, and the data network, and/or the like.

In some implementations, the AMF in example implementation(s) 100 can provide authentication and/or authorization of the UE based on subscribed NSSAI associated with the UE. For example, in some implementations, the subscribed NSSAI can include a list of S-NSSAIs that the UE is subscribed to utilize (e.g., for a communication session). Therefore, the UE can provide the S-NSSAI to the AMF so that the UE can be associated with (e.g., registered to, assigned to, and/or the like) an NSI, which can be considered a virtual network that is implemented through various physical resources of the RAN and/or network functions (NFs) of the core network. As described herein, the AMF instance serving the UE is common (or logically belongs) to all the NSIs that are serving the UE. Other network functions, such as the SMF or the UPF, can be specific to each network slice.

In some implementations, the SMF can handle per session management for the UE and can correspond to a control plane part of the UPF. For example, the SMF can configure traffic steering policies at the UPF, enforce IP address allocation and policies for the UE, and/or the like. The PCF can have an interface to the AMF and support a unified policy framework to govern network slicing, roaming, packet processing, mobility management, and/or the like. The AMF and the SMF can act as termination points for non-access stratum (NAS) signaling, mobility management, and/or the like (e.g., the SMF can act as a termination point for session management related to NAS and remaining NAS signaling can terminate on the AMF).

In some implementations, each DU can store information relating to one or more contexts associated with a UE (e.g., a Data Radio Bearer (DRB) ID, S-NSSAI, QoS flow-level parameters, and/or the like associated with each UE context). Each DU can further store certain network-level information, which can include supported bands, supported bandwidth, whether the network has a standalone configuration using only one radio access technology (RAT) or a non-standalone configuration combining multiple RATs, whether certain shared spectrum (e.g., sub-6 GHz) is shared in a dynamic and/or static manner, and/or the like. In some implementations, the CU-CP node can store a list of network slice IDs (e.g., a list of S-NSSAI) and a network slice-to-AMF (e.g., NSSAI-to-AMF) mapping because there can be an AMF for the entire network or an AMF for a single network slice. Additionally, the CU-CP node can store a mapping between network slice IDs and associated CU-UP node and DU combinations (e.g., indicating a DU and CU-UP node configured to handle traffic associated with a given network slice ID).

Furthermore, in some implementations, the CU-CP node can store a radio bearer priority mapping that can be used to intelligently differentiate traffic associated with different SLAs, QoS requirements, and/or the like (e.g., low-latency versus latency-tolerant traffic). For example, in some implementations, one or more elements in the core network can be configured to detect application types, classify the applications as low-latency or latency-tolerant, and assign respective priorities to the applications based on the application types. The priority information can be provided to the CU-CP node, which can use the priority information to map different applications to different radio bearers. For example, as described in further detail herein, the different radio bearers can include one or more radio bearers that are configured to route traffic through a network slice that includes co-located functions deployed at the RAN edge (e.g., to support low-latency SLAs and/or QoS requirements) and one or more radio bearers that are configured to route traffic through the core network (e.g., to support latency-tolerant traffic). In this way, the radio bearer to priority mapping can be used to provide differentiated treatment for certain traffic flows (e.g., based on SLAs, QoS requirements, and/or the like) and to isolate traffic flows and thereby increase available network, processing, memory, and/or other computing resources such that the respective traffic flows can be serviced more efficiently, among other things.

As shown in FIG. 1A, and by reference number 105, the UE can send a session request (referred to herein as "the request") to the DU to which the UE is currently attached or otherwise connected to initiate one or more communication sessions between the UE and the data network. For example, in some implementations, the request can include an S-NSSAI, which can include one or more service-based information elements used to select and/or associate the S-NSSAI with an NSI for the UE (e.g., a Slice/Service Type (SST) field that refers to an expected Network Slice behavior in terms of features and services, such as enhanced Mobile Broadband (eMBB), Ultra-Reliable Low-Latency Communications (URLLC), Massive IoT (MIot), and/or the like). Accordingly, the UE can utilize the NSI for a communication session associated with the S-NSSAI.

Furthermore, in some implementations, the request sent to the DU can include one or more service identifiers that can identify one or more services to be involved in the one or more communication sessions. For example, the one or more services can include an eMBB service (e.g., for providing enhanced broadband access in dense areas, ultra-high bandwidth access in dense areas, broadband access in public transport systems, and/or the like), a connected vehicles service (e.g., for providing vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like), a real-time service (e.g., for providing inter-enterprise communications, intra-enterprise communications, maps for navigation, and/or the like), an enhanced multi-media service (e.g., for providing broadcast services, on demand and live TV, mobile TV, augmented reality (AR), virtual reality (VR), internet protocol (IP) multi-media subsystem (IMS) service, and/or the like), an Internet of Things (IoT) service (e.g., for providing metering, lighting management in buildings and cities, environmental monitoring, traffic control, and/or the like), a URLLC service (e.g., for providing high-availability and low-latency communications to support process automation, automated factories, tactile interaction, emergency communications, urgent healthcare, and/or the like), a mission critical push-to-talk (PTT) service, a fixed wireless access category service (e.g., for providing localized network access and/or the like), and/or the like.

As further shown in FIG. 1A, and by reference number 110, the CU-CP node can establish one or more contexts to support the one or more sessions based on the one or more services to be involved in the one or more communication sessions. For example, as mentioned above, the CU-CP node can store a list of S-NSSAI, an NSSAI-to-AMF mapping, an NSSAI-to-CU-UP/DU mapping, and a radio bearer priority mapping that can be used to identify one or more network slice policies to be considered when selecting an NSI. In some implementations, the one or more network slice policies can be used to define rules and/or requirements at a network level (e.g., for all or a subset of UEs, for all or specific applications, for all or specific geographic areas, and/or the like) and/or a user level (e.g., per UE, per application, and/or the like). For example, the network slice policies can include an area capacity policy (e.g., a data rate capacity over an area), a mobility policy (e.g., location and speeds of UEs), a density policy (e.g., a number of communications sessions over an area), a guaranteed minimum data rate policy (e.g., minimum download and upload speeds), a maximum bitrate policy (e.g., maximum download and upload bitrates), a relative priority policy (e.g., relative importance of the application and/or UE compared to other applications and/or UEs), an absolute priority policy (e.g., objective importance of the application and/or UE compared to other applications and/or UEs), a latency rate policy (e.g., an end-to-end communications transmission time), a reliability policy (e.g., a communications transmission success rate), a resource scaling policy (e.g., an ability or range for scaling resources up or down), and/or the like.

In some implementations, the set of network slice policies can define a low-latency performance requirement (e.g., an end-to-end communications transmission time less than or equal to a threshold, such as 10 ms), a high latency performance requirement (e.g., an end-to-end communications transmission time greater than a threshold, such as 10 ms), a low reliability performance requirement (e.g., a communications transmission success rate less than a threshold, such as 99.99%), a high reliability performance requirement (e.g., a communications transmission success rate greater than or equal to a threshold, such as 99.99%), a high data rate performance requirement (e.g., download and upload speeds above a threshold, such as 50 Mbps), a low data rate performance requirement (e.g., download and upload speeds less than or equal to a threshold, such as 50 Mbps), a high traffic density requirement (e.g., greater than or equal to a threshold number of user devices per geographical area, such as 10,000 user devices per square kilometer), and/or a low traffic density requirement (e.g., less than a threshold number of user devices per geographical area, such as 10,000 user devices per square kilometer). In some implementations, the set of network slice policies can define a category for a service of a communication session.

In some implementations, based on the set of network slice policies, the CU-CP node can determine the category for each of the one or more services to be involved in the one or more communication sessions requested by the UE and establish the appropriate session context(s) based on whether the category for each of the one or more services is associated with a low-latency SLA and/or low-latency QoS requirements, a latency-tolerant SLA and/or latency-tolerant QoS requirements, and/or the like.

In some implementations, for services that are associated with a low-latency SLA and/or QoS requirements, the CU-CP node can establish a session context mapping such services to the co-located functions deployed at the RAN edge. In particular, the DU at each location in the RAN can be connected to a co-located CU and/or a co-located CU-UP node that is in turn connected to a co-located UPF and a co-located application server. In general, these co-located functions can be located at or near a RAN edge (closer to the UE) to service low-latency applications having performance requirements specifying that a round-trip time satisfy a threshold value (e.g., that the round-trip time is less than or equal to the threshold value). As such, in example implementation(s) 100, the network is designed such that one or more network slices configured to support low-latency services include one or more RAN nodes and one or more core network elements that are co-located at physical locations close to the RAN edge. In this way, the co-located DU, CU(s), UPF, and application server can perform their respective functions within the required latency.

Additionally, or alternatively, for services that are associated with a latency-tolerant SLA and/or latency-tolerant QoS requirements, the CU-CP node can establish a session context mapping such services to network slices that traverse the core network. In particular, the DU at each location in the RAN can be further connected to a centralized CU and/or a centralized CU-UP node that is in turn connected to a UPF deployed in the core network. The UPF deployed in the core network provides an IP anchor point to an application server located in the data network. In general, the centralized RAN node(s), core network element(s), and data network element(s) used to service latency-tolerant applications can be physically and/or logically located farther from the UE, relative to the co-located functions deployed at the RAN edge. As such, in example implementation(s) 100, the network is further designed such that one or more network slices configured to support latency-tolerant services include one or more centralized RAN nodes connected to one or more elements deployed in the core network, which in turn provide an IP anchor point to connect to one or more application servers in the data network.

Figure 1B:
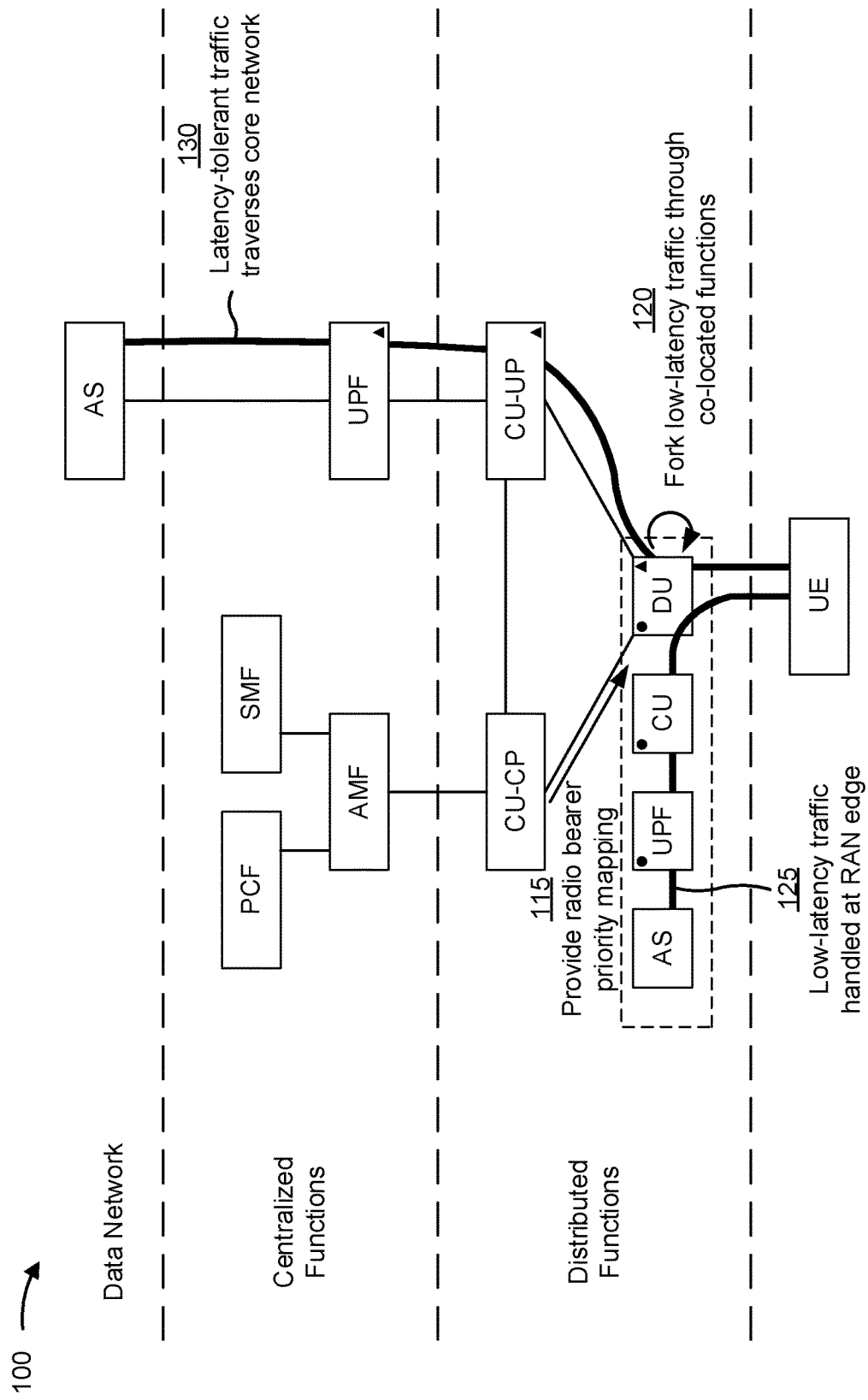

As shown in FIG. 1B, and by reference number 115, the CU-CP node can provide, to the DU serving the UE, a radio bearer priority mapping that can be used to route traffic through an appropriate network slice based on whether the traffic is associated with a service having a low-latency SLA (or low-latency QoS requirements) or a service having a latency-tolerant SLA (or latency-tolerant QoS requirements). For example, as shown in FIG. 1B, the DU serving the UE, the co-located CU, and the co-located UPF are each configured to maintain a context (represented by a circle) relating to a radio bearer configured to carry traffic relating to one or more low-latency services. As further shown in FIG. 1B, the DU serving the UE, the centralized CU-UP node, and the UPF in the core network are each configured to maintain a context (represented by a triangle) relating to a radio bearer configured to carry traffic relating to one or more latency-tolerant services. Accordingly, the radio bearer priority mapping provided to the DU can indicate the network slice assigned to each of the one or more communication sessions requested by the UE, including whether traffic associated with the assigned network slice(s) is to be routed through the co-located functions deployed at the RAN edge or through the core network.

As shown in FIG. 1B, and by reference number 120, the DU serving the UE can use the radio bearer priority mapping to fork low-latency traffic through the co-located functions deployed at the RAN edge. As further shown in FIG. 1B, and by reference number 125, the low-latency traffic can therefore be handled by the co-located functions deployed at the RAN edge (i.e., physically and/or logically closer to the UE). For example, as shown in FIG. 1B, the low-latency traffic can be handled at a network slice that includes the DU serving the UE, the co-located CU, and the co-located UPF, which provides the IP anchor point for the co-located application server. On the other hand, as shown in FIG. 1B, and by reference number 130, latency-tolerant traffic can traverse the core network. For example, as shown in FIG. 1B, the latency-tolerant traffic can be handled at a network slice that includes the DU serving the UE, the centralized CU-UP node, and the UPF located in the core network, which provides the IP anchor point for an application server located in the data network.

Figure 1C:
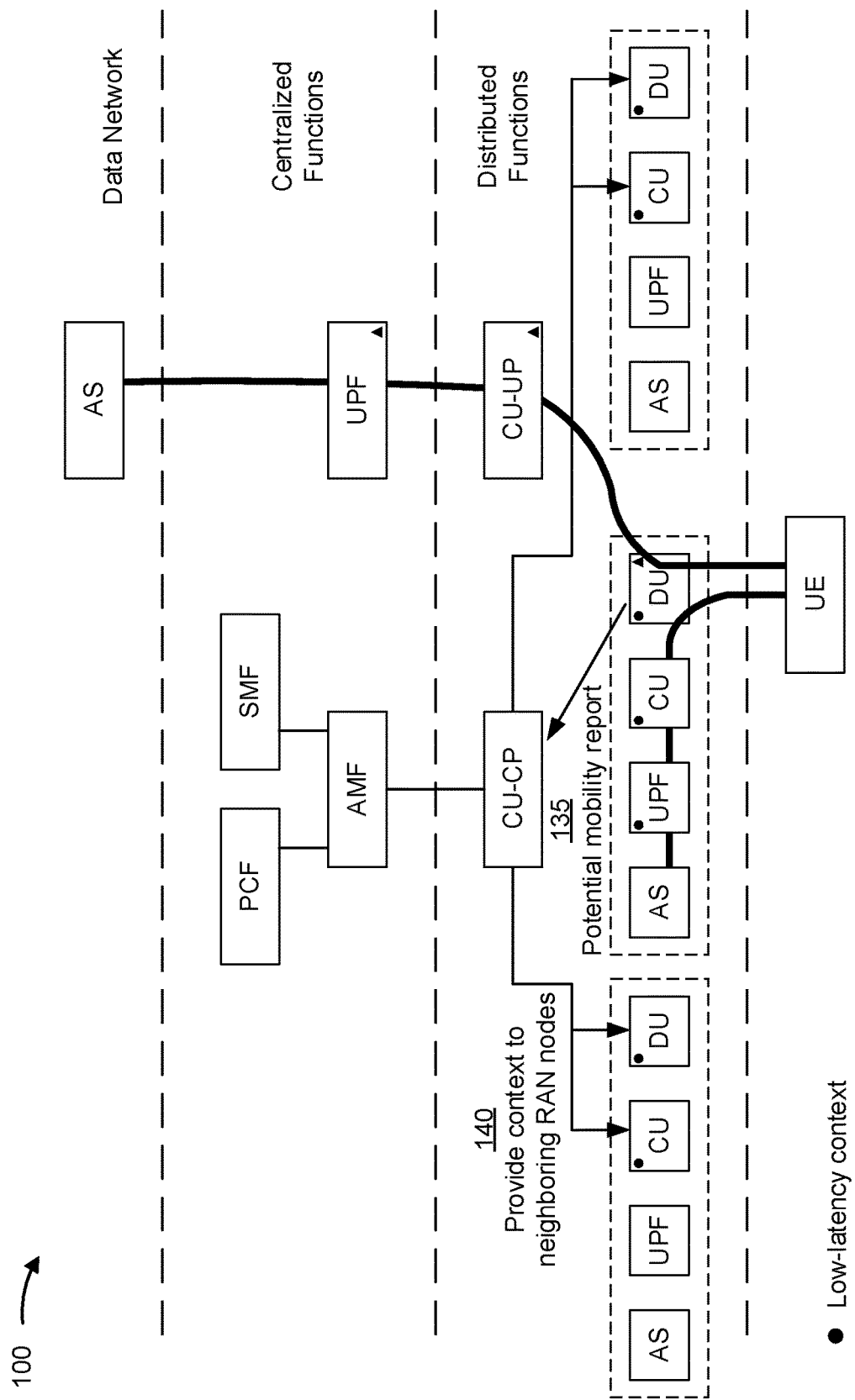

As shown in FIG. 1C, and by reference number 135, the DU serving the UE can provide, to the CU-CP node, a potential mobility report indicating that the UE can potentially be handed over to a different DU. For example, in some implementations, the serving DU can determine that the UE can potentially hand over to a different DU based on a measurement report received from the UE (e.g., indicating that a signal strength from a neighboring DU satisfies a threshold value, that a signal strength from the serving DU satisfies a threshold value, that the UE is moving in a direction away from the serving DU towards one or more neighboring DUs, and/or the like). In some implementations, when the UE is involved in one or more sessions having a low-latency SLA and/or low-latency QoS requirements, the context associated with such session(s) can be moved to support continuity of service.

Accordingly, as further shown in FIG. 1C, and by reference number 140, the CU-CP node can provide the context associated with any low-latency sessions to one or more neighboring RAN nodes that are similarly co-located at the RAN edge to support low-latency services. In some implementations, when the UE is moving from one location served by a serving DU to another location served by a neighboring DU, the CU-CP node can be unable to deterministically establish the DU that the UE will be handed over to next. Nonetheless, based on the potential mobility report, the CU-CP node could determine that the UE is moving in a certain direction and identify multiple candidate cells for the handover. Additionally, or alternatively, the CU-CP node can identify all first-order neighbors of the serving DU as potential candidate cells. Additionally, or alternatively, the CU-CP node can further identify one or more second-order neighbors of the serving DU as potential candidate cells (e.g., where the UE is moving at a fast speed, such as a drone UE that could pass through a first-order neighbor cell and reach the serving area associated with a second-order neighbor in a short amount of time). As such, in anticipation of the potential handover, the CU-CP node can provide the context associated with the low-latency session to the neighboring RAN node(s), which can include one or more co-located DUs and CUs.

In this way, the neighboring RAN node(s) can be provided with the context associated with the low-latency session in advance of any actual handover such that the context supporting the low-latency session will be ready if and/or when an actual handover occurs. Furthermore, in this way, the context can be prepared in the appropriate neighboring RAN node(s) without waiting for the eventual target cell to be resolved, which can enable substantially continuous compliance with the low-latency SLA and/or QoS requirements. In this way, when the UE eventually hands over to a particular neighboring cell, the SLA for the low-latency session will be satisfied regardless of which cell the UE eventually hands over to because the new cell already has the context and is anticipating the possibility that the UE will be attaching to the cell.

Figure 1D:
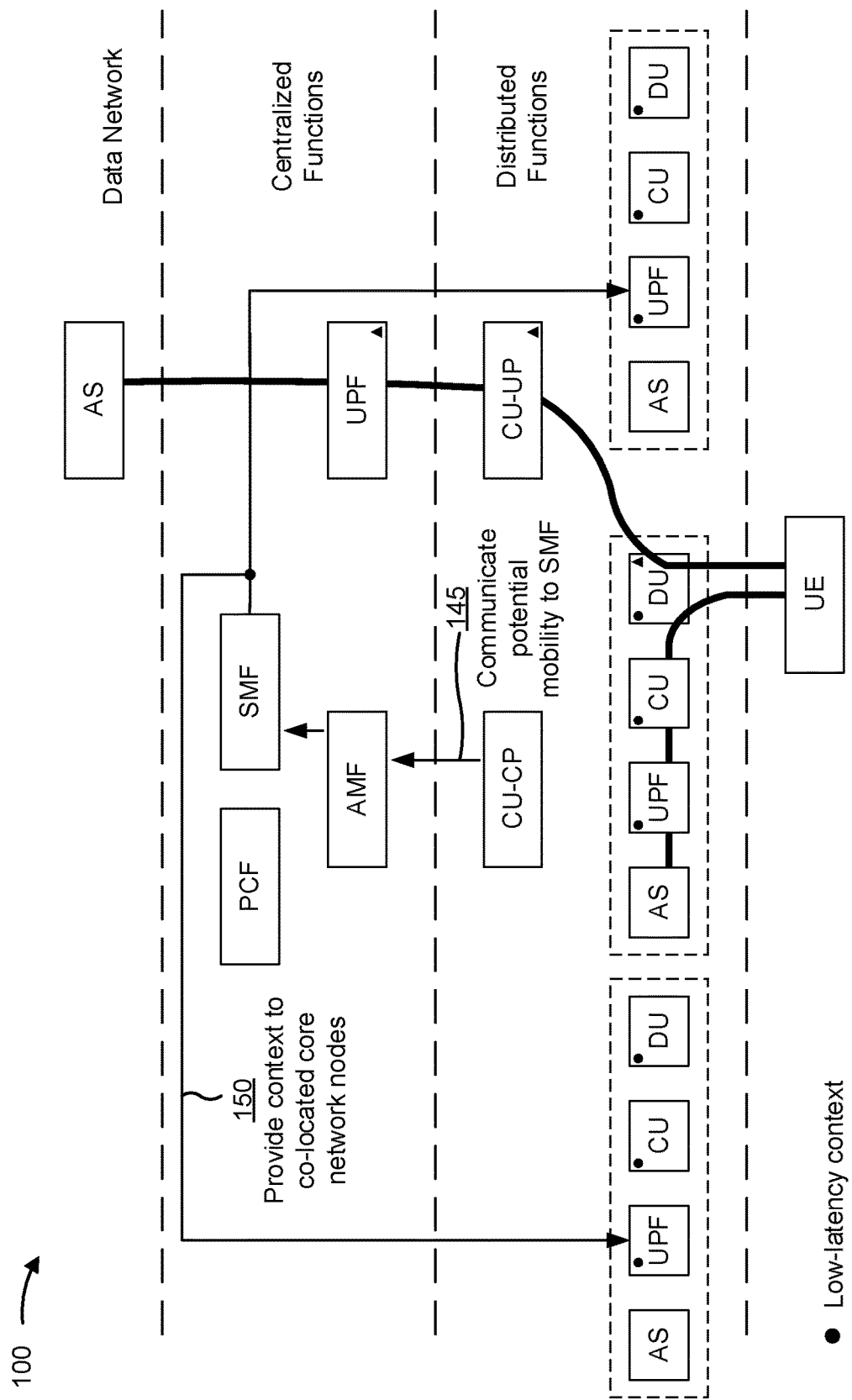

As further shown in FIG. 1D, and by reference number 145, the CU-CP node can further communicate information relating to the potential mobility of the UE to the SMF (e.g., via the AMF). As such, in some implementations, the SMF can provide the context associated with any low-latency sessions to one or more neighboring core network nodes that are co-located at the RAN edge to support low-latency services. For example, in some implementations, the CU-CP node can communicate, to the SMF, information relating to the one or more candidate cells for the potential handover (e.g., all first-order neighbors of the serving DU, a subset of the first-order neighbors that are likely candidate cells for the handover based on a measurement report provided by the UE, location information associated with the UE, a direction in which the UE is moving, and/or the like, one or more second-order neighbors of the serving DU where the UE can be moving at a speed that satisfies a threshold value, and/or the like). As shown in FIG. 1D, and by reference number 150, the SMF can provide the context associated with the low-latency session to the neighboring core network node(s) in anticipation of the potential handover. In particular, as shown in FIG. 1D, the neighboring core network node(s) can include one or more UPFs that are further co-located with the co-located RAN node(s) in the candidate cell(s).

In this way, the neighboring core network node(s) can also be provided with the context associated with the low-latency session in advance of any actual handover such that the context supporting the low-latency session will be ready if and/or when an actual handover occurs. Furthermore, in this way, the context can be prepared in the appropriate neighboring core network node(s) without waiting for the eventual target cell to be resolved, which can enable substantially continuous compliance with the low-latency SLA and/or QoS requirements. In this way, when the UE eventually hands over to a particular neighboring cell, the SLA for the low-latency session will be satisfied regardless of which cell the UE eventually hands over to because the new cell already has the context and is anticipating the possibility that the UE will be attaching to the cell.

In some implementations, with respect to the latency-tolerant traffic, the CU-CP node can permit such traffic to continue to traverse the core network even though the UE can eventually perform a handover to a new cell. For example, because the latency-tolerant traffic can tolerate at least some round-trip delay without violating an applicable SLA and/or QoS requirements, the CU-CP node can avoid the processing burden to prepare the latency-tolerant context in potential candidate cells. In this way, computing resources (e.g., network resources, processing resources, memory resources, and/or the like) can be conserved while continuing to comply with applicable SLA and/or QoS requirements.

Figure 1E:
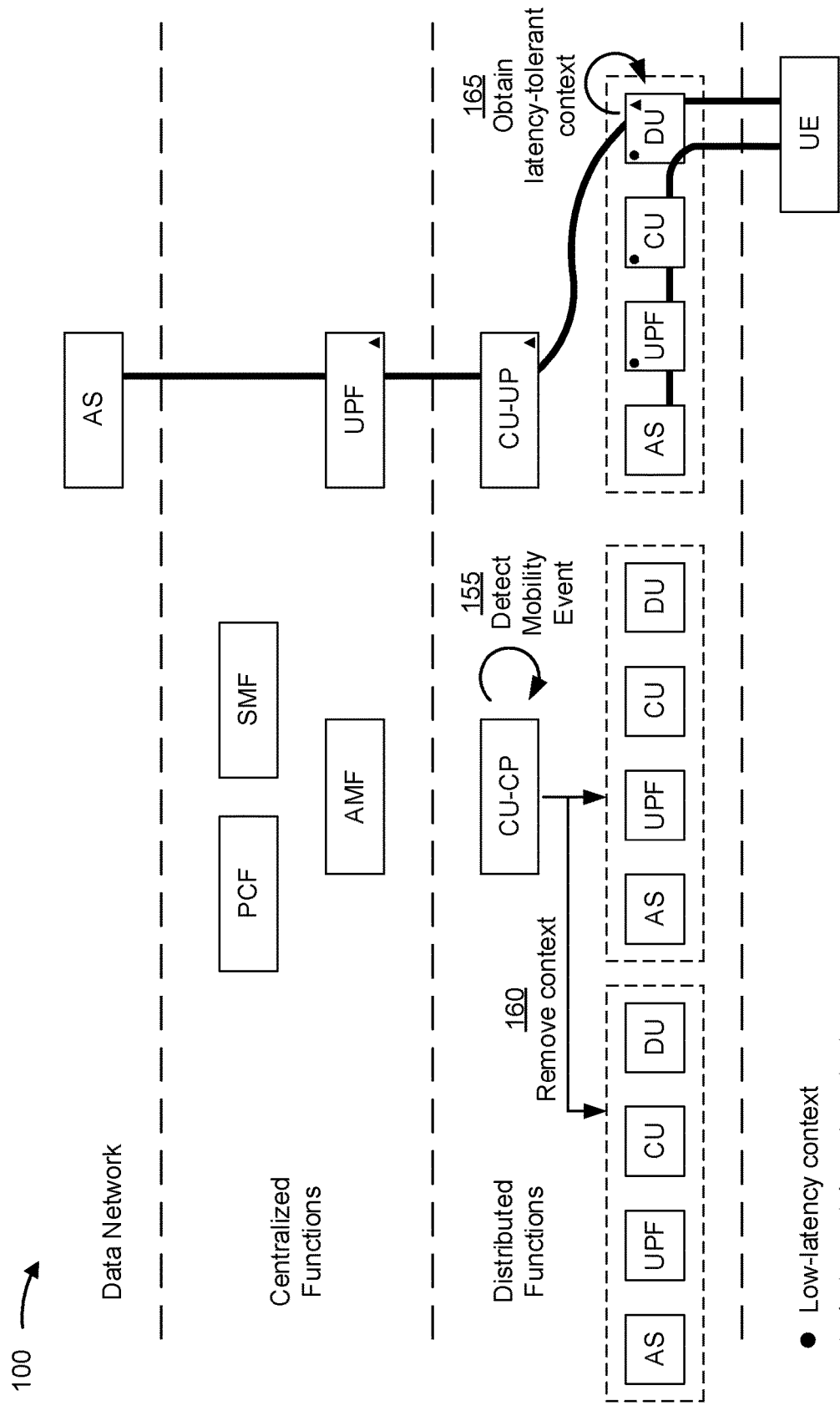

As shown in FIG. 1E, and by reference number 155, the CU-CP node can detect a mobility event indicating that the UE has handed over to the DU associated with a neighboring network slice. Accordingly, as shown in FIG. 1E, the new DU serving the UE can fork the low-latency traffic through the co-located functions that are deployed at the RAN edge using the previously prepared context, while the latency-tolerant traffic can continue to traverse the centralized CU-UP node and the UPF located in the core network. As further shown in FIG. 1E, and by reference number 160, the context associated with the low-latency session and the context associated with the latency-tolerant session can be removed from the previous network slice that had been servicing the low-latency traffic. Furthermore, the low-latency session context that had been provided to other neighboring RAN and/or core network nodes in anticipation of a potential handover can be removed from the neighboring RAN and/or core network nodes that were not targets of the eventual handover. For example, in some implementations, the context can be removed based on a timeout (e.g., a given amount of time passing without receiving any communication from the UE), explicit signaling (e.g., information indicating that the UE has handed over to the target cell), and/or any suitable combination thereof. In this way, computing resources (e.g., network resources, processing resources, memory resources, and/or the like) can be conserved by removing context information associated with a UE that is communicating via a different cell.

As shown in FIG. 1E, and by reference number 165, the new DU serving the UE can obtain the context associated with the latency-tolerant session (if any) and continue to service the latency-tolerant traffic accordingly. For example, in some implementations, certain application classes could be implemented as "lambda" services that do not have a context to be obtained (e.g., context-less services, such as image recognition where recognition of different images can be performed independent of one another). In another example, for applications that are low-context and latency-tolerant, the UE can resubmit the context to the new DU. In still another example, for applications that are high-context and latency-tolerant, the new DU could fetch the context from the previous serving node(s). Accordingly, in some implementations, preparing the context in advance can generally be reserved to cases that involve a low-latency SLA and/or low-latency QoS requirements and/or cases where the UE explicitly requests a low-latency radio bearer for an application that would normally be considered latency-tolerant due to the burden of co-locating nodes at the RAN edge and preparing the context prior to a potential handover.

As indicated above, FIGS. 1A-1E are provided merely as one or more examples. Other examples can differ from what is described with regard to FIGS. 1A-1E.

Figure 2:
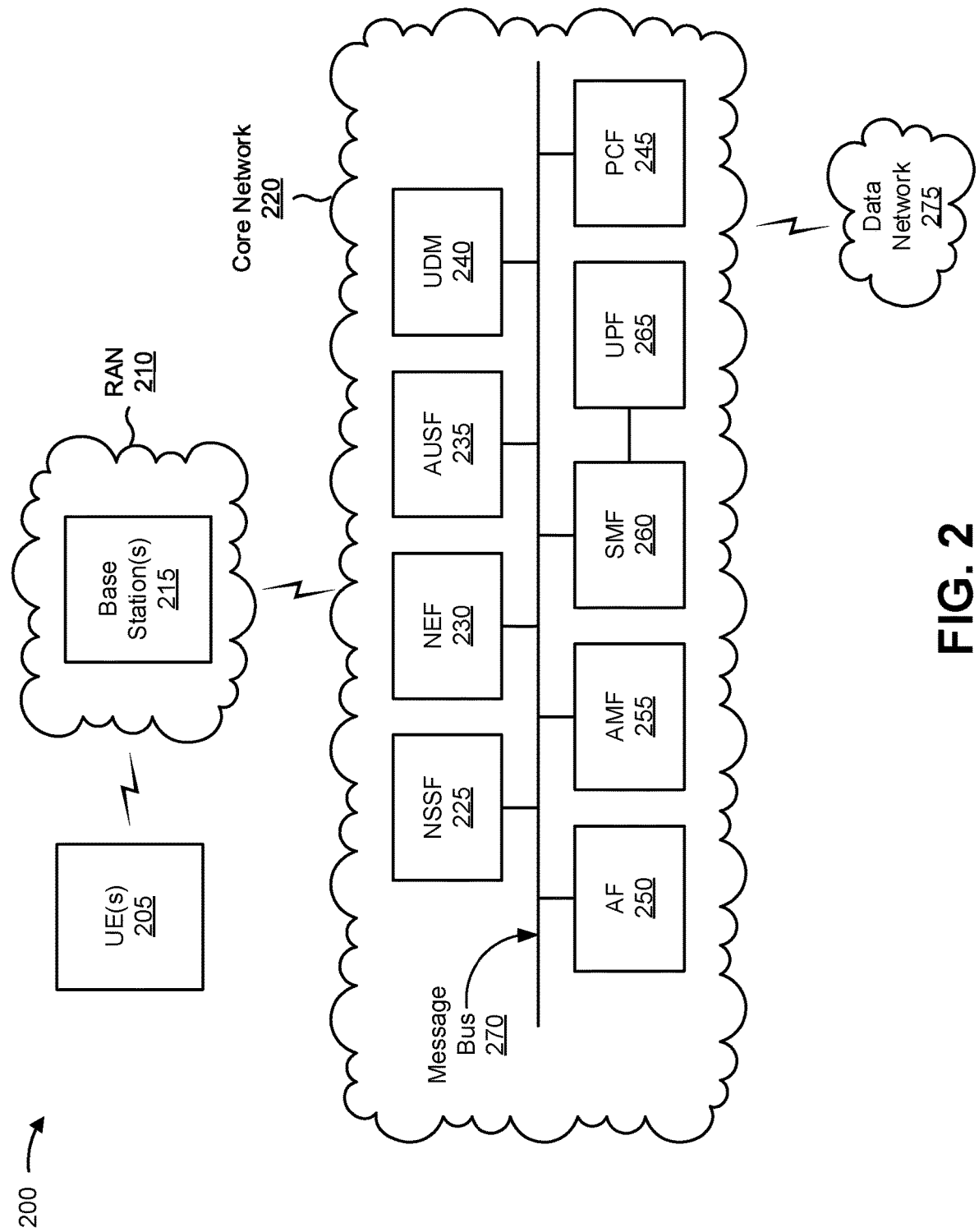
FIG. 2 is a diagram of an example environment in which systems, functional architectures, and/or methods described herein can be implemented.

FIG. 2 is a diagram of an example environment 200 in which systems, functional architectures, and/or methods described herein systems, functional architectures, and/or methods described herein can be implemented. As shown in FIG. 2, environment 200 can include a UE 205, a RAN 210, a base station 215, a core network 220, and a data network 275. As further shown in FIG. 2, core network 220 can include, for example, a Network Slice Selection Function (NSSF) 225, a Network Exposure Function (NEF) 230, an Authentication Server Function (AUSF) 235, a Unified Data Management (UDM) function 240, a Policy Control Function (PCF) 245, an Application Function (AF) 250, an Access and Mobility Management Function (AMF) 255, a Session Management Function (SMF) 260, and a User Plane Function (UPF) 265, which can be communicatively connected via a message bus 270 that can be comprised of one or more physical communication channels and/or one or more virtual communication channels. Devices of environment 200 can interconnect via wired connections, wireless connections, or a combination of wired and wireless connections.

UE 205 includes one or more devices capable of communicating with base station 215 and/or a network (e.g., RAN 10). For example, UE 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 205 can be capable of communicating using uplink (e.g., UE to base station) communications, downlink (e.g., base station to UE) communications, and/or sidelink (e.g., UE-to-UE) communications. In some implementations, UE 205 can include a machine-type communication (MTC) UE, such as an evolved or enhanced MTC (eMTC) UE. In some implementations, UE 205 can include an Internet of Things (IoT) UE, such as a narrowband IoT (NB-IoT) UE and/or the like.

RAN 210 includes a base station and is operatively connected, via a wired and/or wireless connection, to the core network 220 through UPF 265. RAN 210 can facilitate communications sessions between UEs and data network 275 by communicating application-specific data between RAN 210 and core network 220. Data network 275 includes various types of data networks, such as the Internet, a third-party services network, an operator services network, a private network, a wide area network, and/or the like.

Base station 215 includes one or more devices capable of communicating with UE 205 using a cellular RAT. For example, base station 215 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 215 can transfer traffic between UE 205 (e.g., using a cellular RAT), other base stations 215 (e.g., using a wireless interface or a backhaul interface, such as a wired backhaul interface), RAN 210, and/or data network 275. Base station 215 can provide one or more cells that cover geographic areas. Some base stations 215 can be mobile base stations. Some base stations 215 can be capable of communicating using multiple RATs.

In some implementations, base station 215 can perform scheduling and/or resource management for UEs 205 covered by base station 215 (e.g., UEs 205 covered by a cell provided by base station 215). In some implementations, base stations 215 can be controlled or coordinated by a network controller, which can perform load balancing, network-level configuration, and/or the like. The network controller can communicate with base stations 215 via a wireless or wireline backhaul. In some implementations, base station 215 can include a network controller, a self-organizing network (SON) module or component, or a similar module or component. In other words, a base station 215 can perform network control, scheduling, and/or network management functions (e.g., for other base stations 215 and/or for uplink, downlink, and/or sidelink communications of UEs 205 covered by the base station 215).

In some implementations, base station 215 can include a central unit and multiple distributed units. The central unit can coordinate access control and communication with regard to the multiple distributed units. The multiple distributed units can provide UEs 205 and/or other base stations 215 with access to core network 220 or data network 275. For example, in some implementations, the central unit can be a logical node that hosts RRC and PDCP protocols of base station 215 and optionally further hosts an SDAP protocol of base station 215. The multiple distributed units can be logical nodes that host RLC, MAC, and PHY layers of base station 215. In some implementations, one distributed unit can include one or more radios that are used to support one or multiple cells that can provide UEs 205 and/or other base stations 215 with access to core network 220 or data network 275. Furthermore, in some implementations, the central unit can be disaggregated or otherwise split into control plane and user plane nodes. For example, the control plane node can be a logical node hosting the RRC and the control plane part of the PDCP protocol for the central unit of base station 215 while the user plane node can be a logical node that hosts the user plane part of the PDCP protocol and optionally further hosts the SDAP protocol for the central unit of base station 215. In some implementations, a split of layers and/or protocols among the central unit and the multiple distributed units can be flexible.

Accordingly, as used herein, a node associated with RAN 210 (which can be referred to as a "RAN node") can include base station 215, a distributed unit of base station 215, a central unit of base station 215, a control plane part of the central unit of base station 215, a user plane part of the central unit of base station 215, and/or any suitable combination thereof.

Core network 220 can include various functional elements included in a 5G wireless telecommunications system, which can be implemented by one or more of devices (e.g., a device described below with respect to FIG. 3). While the example functional architecture of core network 220 shown in FIG. 2 can be an example of a service-based architecture, in some implementations, core network 220 can be implemented as a reference-point architecture.

As mentioned above, core network 220 can include various functional elements. The functional elements can include, for example, NSSF 225, NEF 230, AUSF 235, UDM 240, PCF 245, AF 250, AMF 255, SMF 260, and UPF 265. These functional elements can be communicatively connected via a message bus 270, which can be comprised of one or more physical communication channels and/or one or more virtual communication channels. Each of the functional elements shown in FIG. 2 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 220 can be operatively connected to a RAN 210, a data network 275, and/or the like, via wired and/or wireless connections with UPF 265.

NSSF 225 can select network slice instances for one or more UEs, such as UE(s) 205, where NSSF 225 can determine a set of network slice policies to be applied at the RAN 210. By providing network slicing, NSSF 225 allows an operator to deploy multiple substantially independent end-to-end networks potentially with the same infrastructure. In some implementations, each network slice can be customized for different services. NEF 230 can support the exposure of capabilities and/or events in the wireless telecommunications system to help other entities in the wireless telecommunications system discover network services and/or utilize network resources efficiently.

AUSF 235 can act as an authentication server and support the process of authenticating UEs in the wireless telecommunications system. UDM 240 can store subscriber data and profiles in the wireless telecommunications system. UDM 240 can be used for fixed access, mobile access, and/or the like, in core network 220. PCF 245 can provide a policy framework that incorporates network slicing, roaming, packet processing, mobility management, and/or the like.

AF 250 can determine whether UEs provide preferences for a set of network slice policies and support application influence on traffic routing, access to NEF 230, policy control, and/or the like. AMF 255 can provide authentication and authorization of UEs. SMF 260 can support the establishment, modification, and release of communications sessions in the wireless telecommunications system. For example, SMF 260 can configure traffic steering policies at UPF 265, enforce UE IP address allocation and policies, and/or the like. AMF 255 and SMF 260 can act as a termination point for Non-Access Stratum (NAS) signaling, mobility management, and/or the like. SMF 260 can act as a termination point for session management related to NAS. RAN 222 can send information (e.g. the information that identifies the UE) to AMF 255 and/or SMF 260 via PCF 245.

UPF 265 can serve as an anchor point for intra/inter Radio Access Technology (RAT) mobility. UPF 265 can apply rules to packets, such as rules pertaining to packet routing, traffic reporting, handling user plane QoS, and/or the like. UPF 265 can determine an attribute of application-specific data that is communicated in a communications session. UPF 265 can receive information (e.g., the information that identifies the communications attribute of the application) from RAN 222 via SMF 260 or an API.

Message bus 270 represents a communication structure for communication among the functional elements. In other words, message bus 270 can permit communication between two or more functional elements. Message bus 270 can be a message bus, HTTP/2 proxy server, and/or the like.

The number and arrangement of functional elements in core network 220 are provided as one or more examples. In practice, core network 220 can have additional functional elements, fewer functional elements, different functional elements, or differently arranged functional elements than those shown in FIG. 2. Furthermore, two or more functional elements in core network 220 can be implemented within a single device, or a single functional element in core network 220 can be implemented as multiple, distributed devices.

Additionally, or alternatively, a set of functional elements (e.g., one or more functional elements) of core network 220 can perform one or more functions described as being performed by another set of functional elements of core network 220.

Data network 275 can include various types of data networks, such as the Internet, a third-party services network, an operator services network, a private network, a wide area network, and/or the like. In some implementations, data network 275 can include one or more application servers configured to support one or more applications associated with a session at the UE(s) 205. Furthermore, in some implementations, data network 275 can include one or more application servers that are deployed at an edge of RAN 210, with such application server(s) co-located with one or more nodes that are associated with RAN 210 (e.g., one or more distributed and/or central units associated with base station 215) and/or one or more nodes associated with core network 220 (e.g., UPF 265) to support sessions that are associated with a low-latency service level agreement (SLA).

The number and arrangement of devices and networks shown in FIG. 2 are provided as one or more examples. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
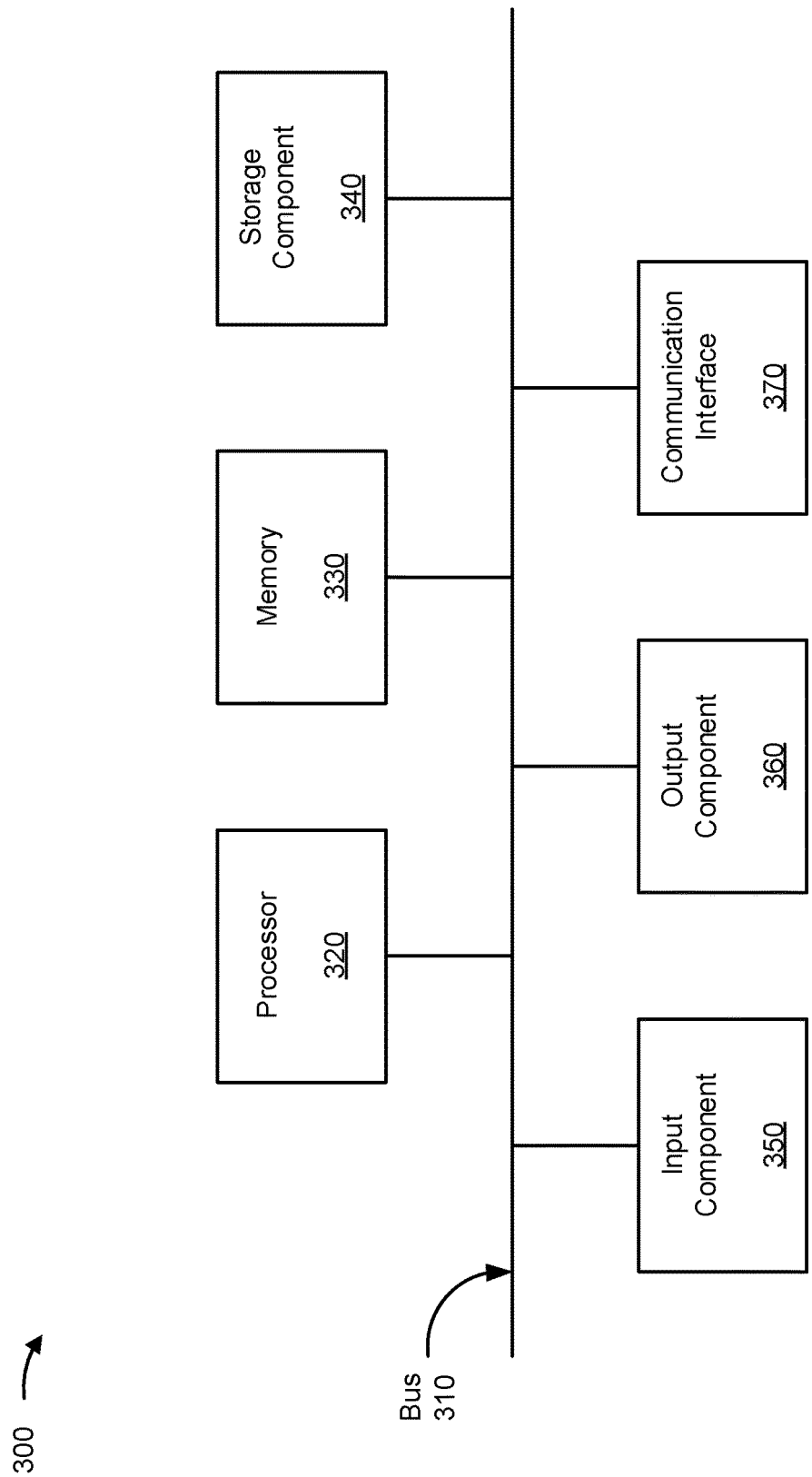
FIG. 3 is a diagram of example components of one or more devices of FIG. 2.

FIG. 3 is a diagram of example components of a device 300. Device 300 can correspond to UE 205, base station 215, a node associated with base station 215 (e.g., a distributed unit of base station 215, a central unit of base station 215, a control plane part of the central unit of base station 215, and/or a user plane part of the central unit of base station 215), NSSF 225, NEF 230, AUSF 235, UDM 240, PCF 245, AF 250, AMF 255, SMF 260, UPF 265, and/or message bus 270. In some implementations, UE 205, base station 215 (or a node associated with base station 215), NSSF 225, NEF 230, AUSF 235, UDM 240, PCF 245, AF 250, AMF 255, SMF 260, UPF 265, and/or message bus 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
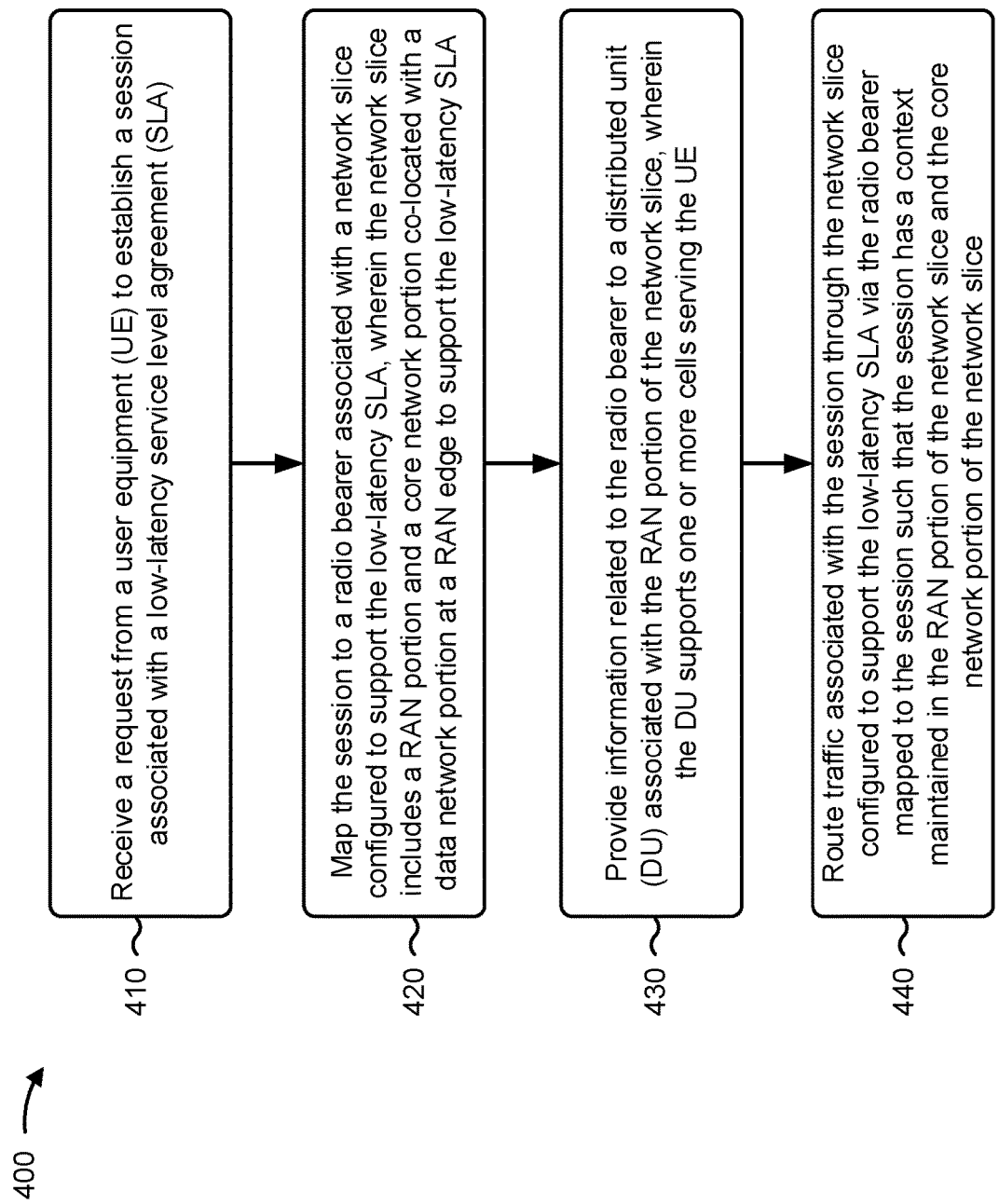
FIG. 4 is a flow chart of an example process for intelligent prioritized mobility of low-latency application.

FIG. 4 is a flow chart of an example process 400 for intelligent prioritized mobility of low-latency applications.

In some implementations, one or more process blocks of FIG. 4 can be performed by a radio access network (RAN) node, such as a base station (e.g., base station 215) or one or more nodes associated with a base station (e.g., a distributed unit (DU), a central unit (CU), a central unit control plane (CU-CP) node, a central unit user plane (CU-UP) node, and/or the like). In some implementations, one or more process blocks of FIG. 4 can be performed by another device or a group of devices separate from or including the RAN node, such as a UE (e.g., UE 205), a core network element (e.g., NSSF 225, NEF 230, AUSF 235, UDM 240, PCF 245, AF 250, AMF 255, SMF 260, UPF 265, and/or the like).

As shown in FIG. 4, process 400 can include receiving a request from a user equipment (UE) to establish a session associated with a low-latency service level agreement (SLA) (block 410). For example, the RAN node (e.g., using processor 320, memory 330, storage component 340, input component 350, communication interface 370, and/or the like) can receive a request from a UE to establish a session associated with a low-latency SLA, as described above.

As further shown in FIG. 4, process 400 can include mapping the session to a radio bearer associated with a network slice configured to support the low-latency SLA, wherein the network slice can include a RAN portion and a core network portion co-located with a data network portion at a RAN edge to support the low-latency SLA (block 420). For example, the RAN node (e.g., using processor 320, memory 330, storage component 340, input component 350, communication interface 370, and/or the like) can map the session to a radio bearer associated with a network slice configured to support the low-latency SLA, as described above. In some implementations, the network slice can include a RAN portion and a core network portion co-located with a data network portion at a RAN edge to support the low-latency SLA.

As further shown in FIG. 4, process 400 can include providing information related to the radio bearer to a distributed unit (DU) associated with the RAN portion of the network slice, wherein the DU can support one or more cells serving the UE (block 430). For example, the RAN node (e.g., using processor 320, memory 330, storage component 340, input component 350, communication interface 370, and/or the like) can provide information related to the radio bearer to a DU associated with the RAN portion of the network slice, as described above. In some implementations, the DU can support one or more cells serving the UE.

As shown in FIG. 4, process 400 can include routing traffic associated with the session through the network slice configured to support the low-latency SLA via the radio bearer mapped to the session such that the session has a context maintained in the RAN portion of the network slice and the core network portion of the network slice (block 440). For example, the RAN node (e.g., using processor 320, memory 330, storage component 340, output component 360, communication interface 370, and/or the like) can route traffic associated with the session through the network slice configured to support the low-latency SLA via the radio bearer mapped to the session such that the session has a context maintained in the RAN portion of the network slice and the core network portion of the network slice, as described above.

Process 400 can include additional implementations, such as any single implementation or any combination of implementations described below and/or in connection with one or more other processes described elsewhere herein.

In some implementations, the RAN node can identify a neighboring network slice that is a potential target for a potential handover of the UE, wherein the neighboring network slice can include a neighboring RAN portion and one or more core network elements that are co-located at the RAN edge to support the low-latency SLA. The RAN node can further provide the context associated with the session to the neighboring network slice in anticipation of the potential handover of the UE. In this way, by providing the context associated with the session to the neighboring network slice in anticipation of the potential handover of the UE, the RAN node can enable substantially continuous compliance with the low-latency SLA during and after a mobility event indicating that the UE has handed over to the neighboring network slice.

For example, in some implementations, when providing the context associated with the session to the neighboring network slice, the RAN node can provide the context associated with the session to one or more network elements in the neighboring RAN portion in anticipation of the potential handover and instruct a core network element to provide the context associated with the session to the one or more core network elements associated with the neighboring network slice in anticipation of the potential handover.

In some implementations, the RAN node can further remove the context maintained in the RAN portion of the network slice and the core network portion of the network slice based on a mobility event indicating that the UE has handed over to the neighboring network slice.

In some implementations, the RAN portion of the network slice can include the DU and at least one central unit (CU), the core network portion of the network slice can include a user plane function (UPF), and the data network portion can include an application server configured to host application data associated with the session.

In some implementations, the RAN node and the RAN portion of the network slice can be distributed nodes associated with a base station serving the UE.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise forms disclosed. Modifications and variations can be made in light of the above disclosure or can be acquired from practice of the implementations.

As used herein, the term "component" is intended to be broadly construed as hardware, firmware, and/or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, at a radio access network (RAN) node, a request from a user equipment (UE) to establish a session associated with a low-latency service level agreement (SLA);
   mapping, by the RAN node, the session to a radio bearer associated with a network slice configured to support the low-latency SLA based on a radio bearer priority mapping that indicates whether particular traffic associated with the network slice is to be routed through co-located functions deployed at a RAN edge or through a core network,
      wherein the core network is separate from the co-located functions, and
      wherein the network slice is configured to support the low-latency SLA by including a RAN portion that is connected to a co-located core network portion that is connected to a co-located data network portion at a physical location at the RAN edge to support the low-latency SLA;
   providing, by the RAN node, information related to the radio bearer to a distributed unit (DU) associated with the RAN portion of the network slice,
      wherein the DU supports one or more cells serving the UE; and
   routing, by the RAN node, low-latency traffic, among the particular traffic, associated with the session through the co-located functions deployed at the RAN edge of the network slice configured to support the low-latency SLA via the radio bearer mapped to the session such that the session has a context maintained in the RAN portion of the network slice and the core network portion of the network slice.

2. The method of claim 1, further comprising:
   identifying a neighboring network slice that is a potential target for a potential handover of the UE,
      wherein the neighboring network slice includes a neighboring RAN portion and one or more core network elements that are co-located at the RAN edge to support the low-latency SLA; and
   providing the context associated with the session to the neighboring network slice in anticipation of the potential handover of the UE.

3. The method of claim 2, wherein providing the context associated with the session to the neighboring network slice comprises:
   providing, by the RAN node, the context associated with the session to one or more network elements in the neighboring RAN portion in anticipation of the potential handover; and
   instructing, by the RAN node, a core network element to provide the context associated with the session to the one or more core network elements in the neighboring network slice in anticipation of the potential handover.

4. The method of claim 2, further comprising:
   removing the context maintained in the RAN portion of the network slice and the core network portion of the network slice based on a mobility event indicating that the UE has handed over to the neighboring network slice.

5. The method of claim 2, wherein providing the context associated with the session to the neighboring network slice in anticipation of the potential handover of the UE enables substantially continuous compliance with the low-latency SLA during and after a mobility event indicating that the UE has handed over to the neighboring network slice.

6. The method of claim 1, wherein the RAN portion of the network slice includes the DU and at least one central unit (CU),
   the core network portion of the network slice includes the a user plane function (UPF), and
   the data network portion includes an application server configured to host application data associated with the session.

7. The method of claim 1, wherein the RAN node and the RAN portion of the network slice are distributed nodes associated with a base station serving the UE.

8. A radio access network (RAN) node, comprising:
   one or more memories; and
   one or more processors, communicatively coupled to the one or more memories, to:
      receive a request from a user equipment (UE) to establish a session associated with a low-latency service level agreement (SLA);
      map the session to a radio bearer associated with a network slice configured to support the low-latency SLA based on a radio bearer priority mapping that indicates whether particular traffic associated with the network slice is to be routed through co-located functions deployed at an RAN edge or through a core network, wherein the core network is separate from the co-located functions, and
wherein the network slice is configured to support the low-latency SLA by including a RAN portion that is connected to a co-located core network portion that is connected to a co-located with a data network portion at a physical location at the RAN edge to support the low-latency SLA;
provide information related to the radio bearer to a distributed unit associated with the RAN portion of the network slice,
wherein the DU supports one or more cells serving the UE; and
route low-latency traffic, among the particular traffic, associated with the session through the co-located functions deployed at the RAN edge of the network slice configured to support the low-latency SLA via the radio bearer mapped to the session such that the session has a context maintained in the RAN portion of the network slice and the core network portion of the network slice.

9. The RAN node of claim 8, wherein the one or more processors are further to:
identify a neighboring network slice that is a potential target for a potential handover of the UE,
wherein the neighboring network slice includes a neighboring RAN portion and one or more core network elements that are co-located at the RAN edge to support the low-latency SLA; and
provide the context associated with the session to the neighboring network slice in anticipation of the potential handover of the UE.

10. The RAN node of claim 9, wherein the one or more processors, when providing the context associated with the session to the neighboring network slice are further to:
provide the context associated with the session to one or more network elements in the neighboring RAN portion in anticipation of the potential handover; and
instruct a core network element to provide the context associated with the session to the one or more core network elements in the neighboring network slice in anticipation of the potential handover.

11. The RAN node of claim 9, wherein the one or more processors are further to:
remove the context maintained in the RAN portion of the network slice and the core network portion of the network slice based on a mobility event indicating that the UE has handed over to the neighboring network slice.

12. The RAN node of claim 9, wherein the one or more processors are to provide the context associated with the session to the neighboring network slice in anticipation of the potential handover of the UE to enable substantially continuous compliance with the low-latency SLA during and after a mobility event indicating that the UE has handed over to the neighboring network slice.

13. The RAN node of claim 8, wherein the RAN portion of the network slice includes the DU and at least one central unit (CU),
the core network portion of the network slice includes a user plane function (UPF), and
the data network portion includes an application server configured to host application data associated with the session.

14. The RAN node of claim 8, wherein the RAN node and the RAN portion of the network slice are distributed nodes associated with a base station serving the UE.

15. A non-transitory computer-readable medium storing instructions, the instructions comprising:
one or more instructions that, when executed by one or more processors of a radio access network (RAN) node, cause the one or more processors to:
receive a request from a user equipment (UE) to establish a session associated with a low-latency service level agreement (SLA);
map the session to a radio bearer associated with a network slice configured to support the low-latency SLA based on a radio bearer priority mapping that indicates whether particular traffic associated with the network slice is to be routed through co-located functions deployed at an RAN edge or through a core network,
wherein the core network is separate from the co-located functions, and,
wherein the network slice is configured to support the low-latency SLA by including a RAN portion that is connected to a co-located core network portion that is connected to a co-located data network portion at a physical location at the RAN edge to support the low-latency SLA;
provide information related to the radio bearer to a distributed unit (DU) associated with the RAN portion of the network slice,
wherein the DU supports one or more cells serving the UE; and
route low-latency traffic, among the particular traffic, associated with the session through the co-located functions deployed at the RAN edge of the network slice configured to support the low-latency SLA via the radio bearer mapped to the session such that the session has a context maintained in the RAN portion of the network slice and the core network portion of the network slice.

16. The non-transitory computer-readable medium of claim 15, wherein the one or more instructions, when executed by the one or more processors, further cause the one or more processors to:
identify a neighboring network slice that is a potential target for a potential handover of the UE,
wherein the neighboring network slice includes a neighboring RAN portion and one or more core network elements that are co-located at the RAN edge to support the low-latency SLA; and
provide the context associated with the session to the neighboring network slice in anticipation of the potential handover of the UE.

17. The non-transitory computer-readable medium of claim 16, wherein the one or more instructions that cause the one or more processors to provide the context associated with the session to the neighboring network slice further cause the one or more processors to:
provide the context associated with the session to one or more network elements in the neighboring RAN portion in anticipation of the potential handover; and
instruct a core network element to provide the context associated with the session to the one or more core network elements in the neighboring network slice in anticipation of the potential handover.

18. The non-transitory computer-readable medium of claim 16, wherein the one or more instructions, when executed by the one or more processors, further cause the one or more processors to:
remove the context maintained in the RAN portion of the network slice and the core network portion of the network slice based on a mobility event indicating that the UE has handed over to the neighboring network slice.

19. The non-transitory computer-readable medium of claim 16, wherein the one or more instructions cause the one or more processors to provide the context associated with the session to the neighboring network slice in anticipation of the potential handover of the UE to enable substantially continuous compliance with the low-latency SLA during and after a mobility event indicating that the UE has handed over to the neighboring network slice.

20. The non-transitory computer-readable medium of claim 15, wherein the RAN portion of the network slice includes the DU and at least one central unit (CU),
- the core network portion of the network slice includes a user plane function (UPF), and
- the data network portion includes an application server configured to host application data associated with the session.

\* \* \* \* \*